(12) United States Patent
Elkins, II et al.

(10) Patent No.: US 7,155,093 B2
(45) Date of Patent: Dec. 26, 2006

(54) DISTRIBUTION CABLE HAVING OVERMOLDED MID-SPAN ACCESS LOCATION WITH PREFERENTIAL BENDING

(75) Inventors: Robert B. Elkins, II, Hickory, NC (US); Lars K. Nielsen, Denver, NC (US); James P. Luther, Hickory, NC (US); Thomas Theuerkom, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/025,507

(22) Filed: Dec. 29, 2004

(65) Prior Publication Data

US 2005/0259929 A1  Nov. 24, 2005

Related U.S. Application Data

(63) Continuation-in-part of application No. 10/852,427, filed on May 24, 2004.

(51) Int. Cl.
   *G02B 6/44* (2006.01)
(52) U.S. Cl. ........................ 385/100; 385/113
(58) Field of Classification Search ................ 385/100
   See application file for complete search history.

(56) References Cited

U.S. PATENT DOCUMENTS

| 4,961,623 A | 10/1990 | Midkiff et al. | ............. 350/96.2 |
|---|---|---|---|
| 5,042,901 A | 8/1991 | Merriken et al. | ........... 385/135 |
| 5,121,458 A | 6/1992 | Nilsson et al. | .............. 385/100 |
| 5,125,060 A | 6/1992 | Edmundson | ................. 385/100 |
| 5,210,812 A | 5/1993 | Nilsson et al. | .............. 385/100 |
| 5,440,665 A | 8/1995 | Ray et al. | ................... 385/135 |
| 5,528,718 A | 6/1996 | Ray et al. | ................... 385/136 |
| 5,657,413 A | 8/1997 | Ray et al. | ................... 385/139 |

*Primary Examiner*—Sung Pak

(57) ABSTRACT

A fiber optic distribution cable assembly having at least one factory-prepared mid-span access location for accessing and terminating optical fibers of the distribution cable includes a tether containing at least one optical fiber optically connected to an optical fiber terminated from the distribution cable and an overmolded body encapsulating the distribution cable and a portion of the tether to form the mid-span access location. The mid-span access location is provided with a preferential bend along an axis that is common to the distribution cable and the tether by a strength member positioned within the overmolded body and/or the overmolded body having a geometrical configuration that promotes bending along the common axis. The preferential bend reduces any path length differences between terminated optical fibers routed substantially on the common axis and optical fibers remaining within the distribution cable induced by bending, thereby preventing breakage of the terminated optical fibers.

20 Claims, 3 Drawing Sheets

DISTRIBUTION CABLE HAVING OVERMOLDED MID-SPAN ACCESS LOCATION WITH PREFERENTIAL BENDING

CROSS REFERENCE TO RELATED APPLICATION

This application is a continuation in part of co-pending U.S. application Ser. No. 10/852,427, filed May 24, 2004, entitled Distribution Cable Assembly Having Overmolded Mid-Span Access Location.

BACKGROUND OF THE INVENTION

1. Field of the Invention

The present invention relates generally to a fiber optic distribution cable deployed in a fiber optic communications network and, more particularly, to a factory-prepared fiber optic distribution cable assembly having a flexible overmolded mid-span access location with a preferential bend.

2. Description of the Related Art

Optical fiber is increasingly being used for a variety of broadband applications including voice, video and data transmissions. As a result, there is a need for connecting remote locations to a fiber optic distribution cable in order to provide broadband services to an end user, commonly referred to as a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx." networks. To provide these services to the subscriber, FTTx networks must include a large number of interconnection points, referred to herein as "tap points," at which one or more optical fibers of a distribution cable are interconnected or mated to optical fibers of one or more cables leading to a subscriber location. In addition, in order to reduce installation labor costs in FTTx networks, communications service providers are increasingly pre-engineering new fiber optic networks and demanding factory-prepared interconnection solutions, commonly referred to as "plug-and-play" systems.

To supply the large number of tap points needed and to satisfy the demand for plug-and-play systems, it is apparent that more efficient methods of providing mid-span access locations along the length of a distribution cable are needed. Presently, to perform a mid-span access of a distribution cable, a section of the cable sheath is removed at a predetermined location along the length of the distribution cable, thereby exposing a plurality of optical fibers disposed in buffer tubes that are helically wound within the cable. Once the section of cable sheath is removed, preselected optical fibers are severed and withdrawn from the distribution cable to produce one or more terminated optical fibers that are presented for splicing or interconnection at the tap point. Oftentimes, the terminated optical fibers are smoothly transitioned out of their respective buffer tube(s) and spliced to optical fibers of a length of tether cable that is attached to the distribution cable at the mid-span access location. After splicing is completed, the mid-span access location is typically covered using an overmolding process that protects the splices and the exposed section of the distribution cable resulting in the creation of a mid-span access location. In order to access a sufficient length of the optical fibers for splicing with the tether cable, the mid-span access location typically has a length up to about 36 inches.

By terminating the preselected optical fibers and transitioning them out of their respective buffer tubes and away from the distribution cable, the terminated optical fibers are routed along a path that is different than the path of the remaining optical fibers of the distribution cable. As the mid-span access location is bent, for example when rolled on a reel, pulled through a conduit having a bend, or pulled over an aerial installation pulley, path length differences may arise for the optical fibers terminated from the distribution cable. If the bending strain on the optical fibers is great enough, these path length differences may lead to attenuation, or in a worst case, the optical fibers may fail due to excessive axial tension stresses induced by bending. In addition to axial tension stresses on the optical fibers, tension stresses may also be placed on the overmolded mid-span access location at places where the overmold material is thinnest, leading to the sealing integrity of the overmold possibly being compromised. Specifically, the mid-span access location may have less overmold material at the top and bottom when the distribution cable and the tether cable are oriented one on top of the other. In other words, the overmolded mid-span access location has a generally tubular cross-sectional shape. If more than one cable (i.e., the distribution cable and the tether cable) is disposed within the mid-span access location, the thickness of the overmold material around all sides of the cables is not uniform, thus resulting in areas having lesser tensile strength.

There are several possible designs of mid-span access locations that address the problems described above associated with path length differences between the terminated optical fibers and the optical fibers remaining in the helically wound buffer tubes of the distribution cable. In one example, a rigid mid-span access location is provided to entirely eliminate bending of the mid-span access location. Obvious drawbacks to a rigid mid-span access location include the inflexibility to installation requirements and the increased diameter of a rigid mid-span access location. Another example is a mid-span access location that includes a slack storage region and/or generous passages within the mid-span access location to accommodate the path length differences between the terminated optical fibers and the remaining optical fibers that arise due to bending. However, the above examples result in a more complex arrangement having a larger cross-sectional area, thus resulting in installation inflexibility.

Accordingly, there is a specific and unresolved need for a factory-prepared fiber optic distribution cable assembly having one or more predetermined mid-span access locations along the length of a distribution cable for accessing and terminating a plurality of optical fibers, wherein each mid-span access location is provided with a preferential bend such that the terminated optical fibers are not subjected to undesirable axial tension loads induced by bending during normal handling and deployment. It is further desirable to provide a factory-prepared fiber optic distribution cable assembly having one or more predetermined mid-span access locations along the length of the distribution cable for accessing and terminating a plurality of optical fibers, wherein each mid-span access location is provided with a strength member or a geometric configuration to provide the mid-span access location with a preferential bend and an outer diameter that is only minimally larger than the outer diameter of the distribution cable. It would also be desirable to provide a fiber optic distribution cable assembly having one or more low-profile mid-span access locations that is sufficiently flexible to satisfy demanding installation requirements, such as through small-diameter conduits and over sheave wheels and pulleys.

BRIEF SUMMARY OF THE INVENTION

To achieve the foregoing and other objects, and in accordance with the purposes of the invention as embodied and broadly described herein, the present invention provides various embodiments of a factory-prepared fiber optic distribution cable assembly having at least one predetermined mid-span access location with a preferential bend to reduce the path length differences between the optical fibers terminated from the distribution cable and the optical fibers remaining in the helically wound buffer tubes of the distribution cable, thereby preventing breakage of the terminated optical fibers due to axial tension stresses induced by bending. At each mid-span access location, a plurality of optical fibers are accessed, severed, transitioned and routed separately from the remaining optical fibers of the distribution cable. The terminated optical fibers are spliced or otherwise optically connected to respective optical fibers of a tether cable. The downstream end of the tether cable may terminate in splice-ready optical fibers, connectorized optical fibers, one or more optical connection terminals, a pedestal or any other terminal for connecting optical fibers. As used herein, the terms "tether" and "tether cable" should be understood to include any fiber optic cable, drop cable, branch cable, sub-distribution cable or like conduit for routing and protecting at least one optical fiber.

Each mid-span access location of the distribution cable assembly is provided with a preferential bend such that breakage of terminated optical fibers resulting from axial tension stresses induced by bending is prevented. In particular, the terminated optical fibers are protected during normal handling, cable reeling, un-reeling and installation. The entire distribution cable assembly, including the mid-span access locations and attached tether cables, is suitable for installation through small-diameter conduits or over aerial installation sheave wheels and pulleys as a result of the low-profile design of the mid-span access locations. In several embodiments, a strength member is added to each mid-span access location prior to overmolding in order to provide a preferential bend, thereby preventing damage to the encapsulated optical fibers caused by path length differences that result from bending the mid-span access location. In other embodiments, the mid-span access location is overmolded with a geometrical configuration such that the mid-span access location bends along a preferred axis. In still further embodiments, both a strength member is added to the mid-span access location prior to overmolding, and the mid-span access location is overmolded with a geometrical configuration that promotes bending along a preferred axis.

In an exemplary embodiment, the present invention provides a factory-prepared fiber optic distribution cable assembly comprising at least one predetermined mid-span access location positioned along the length of the distribution cable, at least one additional strength member axially aligned with the distribution cable, at least one tether attached to the distribution cable at the mid-span access location, and a flexible overmolded body encapsulating the mid-span access location. The alignment of the strength member and the distribution cable creates a preferential bend along a common axis, thereby reducing any path length differences induced by bending and preventing breakage of the optical fibers terminated from the distribution cable.

In another exemplary embodiment, the present invention provides a factory-prepared fiber optic distribution cable assembly comprising at least one predetermined mid-span access location positioned along the length of the distribution cable, at least one strength member structure having a predetermined shape, at least one tether attached to the distribution cable at the mid-span access location, and a flexible overmolded body encapsulating the mid-span access location and the strength member structure. The addition of the strength member structure creates a preferential bend along a preferred axis, thereby reducing any path length differences induced by bending and preventing breakage of the optical fibers terminated from the distribution cable.

In yet another exemplary embodiment, the present invention provides a factory-prepared fiber optic distribution cable assembly comprising at least one predetermined mid-span access location positioned along the length of the distribution cable, one or more optical fibers accessed and terminated from the distribution cable at the mid-span access location, a tether cable attached to the distribution cable at the mid-span access location, and a flexible overmolded body encapsulating the mid-span access location and having a geometric configuration such that a preferential bend is created along a common axis, thereby reducing any path length differences induced by bending and preventing breakage of the optical fibers terminated from the distribution cable.

In yet another exemplary embodiment, the present invention provides a factory-prepared fiber optic distribution cable assembly comprising at least one predetermined mid-span access location positioned along the length of the distribution cable, one or more optical fibers accessed and terminated from the at least one mid-span access location, an additional strength member axially aligned with the distribution cable, a tether cable attached to the distribution cable at the mid-span access location, and a flexible overmolded body encapsulating the mid-span access location and having a geometric configuration such that a preferential bend is created along a common axis, thereby reducing any path length differences induced by bending and preventing breakage of the optical fibers terminated from the distribution cable.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
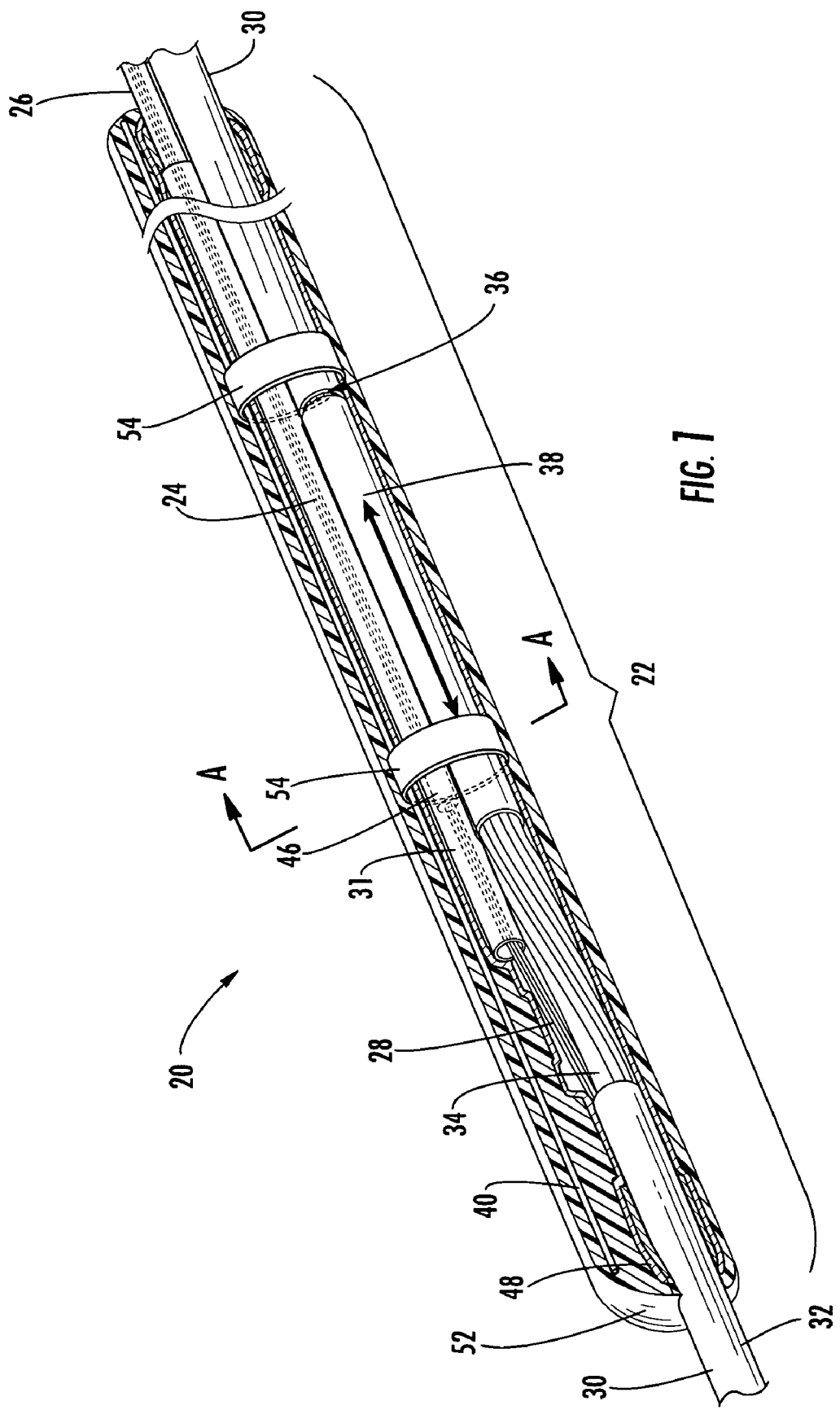
FIG. 1 is a perspective view of a typical mid-span access location of a distribution cable assembly including a plurality of optical fibers terminated from the distribution cable and transitioned into a tether, a strength member axially aligned with the distribution cable, and a flexible overmolded shell encapsulating the mid-span access location and securing a portion of the tether cable to the distribution cable in accordance with an exemplary embodiment of the present invention.

The present invention will now be described more fully hereinafter with reference to the accompanying drawings in which exemplary embodiments of the invention are shown. However, the present invention may be embodied in many different forms and should not be construed as limited to the particular embodiments set forth herein. These exemplary embodiments are provided so that this disclosure will be both thorough and complete, and will fully convey the scope of the invention to those skilled in the art. Like reference numbers refer to like elements throughout the various drawings.

The fiber optic distribution cable assembly of the present invention comprises at least one location along the length of the distribution cable, referred to herein as a "mid-span access location," for providing access to at least one optical fiber terminated from the distribution cable. In preferred embodiments, the distribution cable assembly comprises a plurality of predetermined mid-span access locations at spaced apart locations along the length of the distribution cable, thus providing multiple access locations, or tether attach points (also referred to herein as "tap points") for attaching a tether cable to the distribution cable. The fiber optic distribution cable assembly may be wound upon a reel for storage, transport and deployment in aerial and buried applications. Preferably, the distribution cable assembly is manufactured and prepared in a factory, thus eliminating the need for first installing a fiber optic distribution cable and then performing a mid-span access and splicing in the field, for example at a telephone pole or in a network distribution or termination enclosure, such as a closure, pedestal or terminal. The distribution cable assembly of the present invention offers communications service providers factory-prepared, low-profile mid-span access locations on a distribution cable having an outer diameter that is only minimally larger than the outer diameter of the distribution cable. The mid-span access locations of the distribution cable assembly have lengths up to about 4 feet, and more preferably up to about 3 feet, while maintaining sufficient flexibility and bend preference, as described and shown in the exemplary embodiments provided herein.

The optical fibers terminated from the distribution cable at the mid-span access location are smoothly transitioned from their respective buffer tube(s) into a separate tubular body, such as a relatively crush-resistant tube or conduit, referred to herein as a "tether" or "tether cable." The remaining optical fibers of the distribution cable are managed and routed separately from the terminated optical fibers such that they extend uninterrupted through the distribution cable and are available for terminating from the distribution cable at other downstream mid-span access locations. By routing the terminated optical fibers separately from the optical fibers remaining in the buffer tubes of the distribution cable and into the tether, path length differences between the terminated optical fibers and the remaining optical fibers arise when the mid-span access location is bent, or example during normal handling, transport and deployment. These path length differences induced by bending occur unless the terminated optical fibers are routed along the neutral bending axis as they transition from the distribution cable into the tether. In the embodiments illustrated herein, the terminated optical fibers are spliced to optical fibers of a tether cable having a predetermined length greater than about 12 feet. The tether cable presents the terminated optical fibers of the distribution cable for interconnection with optical fibers of a drop cable or branch cable in an optical communications network in various configurations, including but not limited to, splice-ready optical fibers, pre-connectorized optical fibers and pre-connectorized optical fibers positioned within connector ports of optical connection terminals. In all embodiments, the optical fibers of the tether cable may terminate in a variety of connector types, such as but not limited to SC, LC, DC, FC, ST, SC/DC, MT-RJ, MTP, MPO and other like single or multi-fiber ferrules now known or hereafter developed.

In all embodiments shown and described herein, various types of distribution cables may be accommodated, such as monotube, loose tube, central tube, ribbon and the like. One example of a type of distribution cable suitable for use in conjunction with present invention is an ALTOS® dielectric cable available from Corning Cable Systems LLC of Hickory, N.C. The ALTOS® dielectric cable is a lightweight fiber optic cable designed for both buried conduit and aerial deployments. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a gel-filled tube. Regardless, the distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals now known or hereafter developed. In preferred embodiments, the distribution cable is flexible, easy to route and has no preferential bend. In all embodiments shown and described herein, various types of tethers may also be accommodated, such as monotube, loose tube, central tube and ribbon, and the tether may be disposed within another tubular body in a tether cable assembly.

Referring now to FIG. 1, a distribution cable assembly 20 having a mid-span access location 22 constructed in accordance with an exemplary embodiment of the present invention is shown. The mid-span access location 22 provides a means for optically connecting one or more optical fibers 24 of a tether cable 26 to one or more optical fibers 28 terminated from a fiber optic distribution cable 30. Optical fibers 28 are therefore also referred to herein as "terminated optical fibers 28." The tether cable 26 may itself be overmolded at the mid-span access location, or may be disposed within a tubular body 31 that is overmolded. As is well known and understood in the art, the one or more optical fibers 24 of the tether cable 26 and the one or more terminated optical fibers 28 may be spliced together in any conventional manner, such as by fusion or mechanical splicing, either individually or in mass. In an alternative embodiment, the optical fibers 28 terminated from the distribution cable 30 may be optically connected to the optical fibers 24 of the tether cable 26 with optical connectors mounted upon the ends of the optical fibers 24 (i.e., a "pigtail") and the optical fibers 28. The tether cable 26 may ultimately be interconnected with a fiber optic branch cable or a fiber optic drop cable containing one or more optical fibers connected to an outside plant optical connection terminal, such as a network interface device (NID) at a subscriber premises. Thus, the distribution cable assembly 20 provides a tethered distribution point in a fiber optic network for interconnecting optical fibers of a distribution cable with optical fibers of a fiber optic branch cable or fiber optic drop cable, referred to herein generically as a "drop cable."

The mid-span access location 22 is the point along the length of the distribution cable 30 at which a single fiber or a subset of optical fibers 28 are severed and routed separately from the optical fibers remaining within the buffer tubes 34 of the distribution cable 30. To prepare a mid-span access location 22 in the factory, a section of the sheath 32 of the distribution cable 30 is removed to expose the plurality of buffer tubes 34 within the cable sheath 32. As shown, the buffer tubes 34 are helically wound in a known manner. The exposed length of the distribution cable 30 and the buffer tubes 34 may vary. However, in a preferred embodiment, the length ranges between about 3 and about 36 inches. A ring-cut 36 is then made through the sheath 32 about 5 to 20 inches upstream of the exposed section of buffer tubes 34. By ring cutting the cable sheath 32, a portion 38 becomes slidable along the exposed section of buffer tubes 34 in the directions indicated by the double-arrowed line. The portion 38 may remain in place to cover a portion of the exposed buffer tubes 34 once the one or more optical fibers 28 have been severed and the ends removed, referred to in the art as "fished," from their respective buffer tube(s) 34. The exposed length of the buffer tubes 34 allows for about 5 to about 30 inches of optical fiber to be withdrawn from the distribution cable 30 for subsequent splicing, thereby providing sufficient slack fiber length for more than one splice attempt.

For a given mid-span access location 22, the appropriate buffer tube 34 may be accessed using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes 34 remain helically wrapped around a central member (not shown). The NOFAT tool provides a guide that allows a scalpel to open a buffer tube 34 without cutting completely through the buffer tube 34 or the optical fibers disposed within the buffer tube 34. The NOFAT tool is compatible with standard sizes of buffer tubes 34 utilized in Corning Cable Systems ALTOS® Cable. Once the optical fibers 28 have been withdrawn from their respective buffer tube(s) 34, the 250 µm coated optical fibers 28 are then smoothly transitioned and spliced, as described above, to the optical fibers 24 of the tether cable 26. The splice points may be held and protected using one or more splice protectors 46 or heat deformable material. The optical fibers 28 of the distribution cable 30 are routed through a flexible, yet relatively crush-resistant tubing 31 in order to protect the optical fibers 24, 28 and to provide a guide channel for the optical fibers 24 into the tether cable 26. In an alternative embodiment, the terminated optical fibers 28 may be routed directly into the tether cable 26. Preferably, the tubular body 31 and/or the tether cable 26 are axially aligned with the distribution cable 30 to provide a low-profile, minimum diameter mid-span access location suitable for installation in buried and aerial deployments.

Axially aligned with the distribution cable 30 is a strength member 40 operable for providing a preferential bend along an axis that is common to both the distribution cable 30 and the tether cable 26 or tubular body 31. The preferential bend is operable for minimizing breakage of the terminated optical fibers 28 due to axial tension stresses that result from any path length differences between the terminated optical fibers 28 and the remaining optical fibers when the distribution cable is bent during normal handling, transport or deployment. The strength member 40 is preferably rod shaped and extends lengthwise along the length of the mid-span access location 22. However, it will be appreciated by those skilled in the art that the strength member 40 may have a variety of different shapes sufficient to create a mid-span access location with a preferential bend. The strength member 40 is positioned within the mid-span access location 22 prior to forming the overmolded body 52, as will be described, using one or more conventional fasteners 54, such as tape or strapping. Preferably, the strength member 40 is formed from glass reinforced plastic (GRP). However, it will be understood by those skilled in the art that any plastic, fiber-glass, composite, yarn or metal material having a bend radius compatible with the bend radius of the distribution cable to create a preferential bend of the mid-span access location may be used.

An optional overmolding material-blocking wrap 48 or protective layer may be added to the mid-span access location around the distribution cable 30 and tether cable 26 or tubular body 31 prior to overmolding. The wrap 48 may be positioned around the distribution cable 30 adjacent one end of the mid-span access location 22 and around the distribution cable 30 and tether cable 26 adjacent the other end of the mid-span access location 22. The wrap 48 such as, but not limited to, a foil made of tin or aluminum, is used to protect the underlying components of the mid-span access location 22, and in particular the exposed length of the buffer tubes 34, prior to overmolding the entire length of the mid-span access location 22. Other materials, such as water swellable tape, may be used to protect the mid-span access location 22 prior to overmolding, provided that the material is capable of being shaped or formed to the underlying components, including the distribution cable 30, the tether cable 26 and the transition area between the distribution cable 30 and the tether cable 26.

The overmolding process involves preparing the sheath 32 of the distribution cable 30 in a manner known in the art, such as by cleaning and roughening, flame preparing or chemically etching the surface of the sheath 32. The overmolding process involves placing the distribution cable assembly 20 minus the overmolded body 52, into an overmolding tool (not shown) and injecting a flexible, encapsulant material into the cavity defined by the tool. The tool generally comprises a plurality of injection ports for injecting the overmolding material. Materials suitable for overmolding include, but are not limited to, polyurethane, silicone, thermoplastics and like materials. The overmolding material will flow into any void between the tool and the underlying components. The encapsulant material forms an overmolded body 52 that provides an outer protective shell, maintains sealing integrity between the underlying components and the external environment, and the and is capable of withstanding crush forces up to at least about 300 lbs.

The entire overmolded mid-span access location 22 is preferably up to about 36 inches in length and is sufficiently flexible to permit the distribution cable assembly 20 to be deployed through conduit or over aerial lashing equipment. The actual degree of flexibility, and in particular the bending and torsion flexibility, is dependent upon the material chosen and the geometry of the underlying components. For example and as stated above, inclusion of the strength member 40 in the overmolded mid-span access location 22 creates a preferential bend along a neutral axis on which the terminated optical fibers 28 may be routed. In the various embodiments described herein, the overmolded body 52 may have a geometrical configuration that further promotes bending of the mid-span access location 22 along a preferred axis. The mid-span access location 22 also has a low-profile shape and is preferably formed with rounded or tapered ends so as to avoid snagging during deployment of the distribution cable assembly 20 through conduits or over aerial lashing equipment.

Still referring to FIG. 1, the tether cable 26 is securely attached to the distribution cable 30 at the mid-span access location 22 by the overmolded body 52. Alternatively, the tether cable 26 and the distribution cable 30 may be secured together using the conventional fastener 54 prior to overmolding the mid-span access location 22 in order to provide additional bi-directional pulling strength. The end of the tether cable 26 may also be fed into the protective tube 31 in order to further protect the optical fibers 24 of the tether cable 26.

Figure 2:
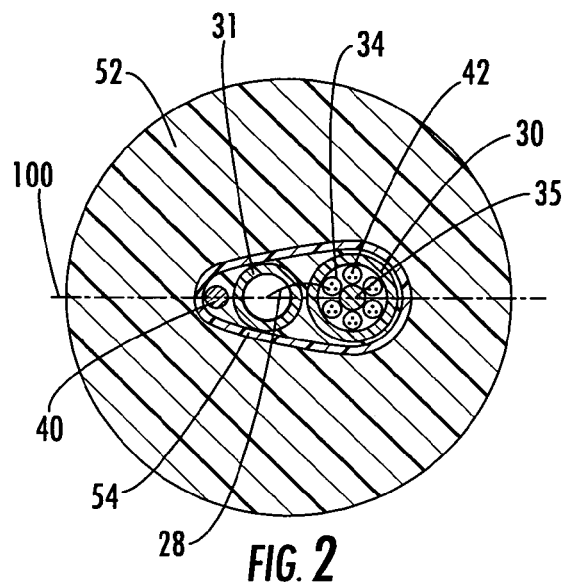
FIG. 2 is a cross-sectional view of the mid-span access location of the distribution cable assembly of FIG. 1 taken along line A—A.

Referring now to FIG. 2, a cross-sectional view of the distribution cable assembly 20 taken through mid-span access location 22 at line A—A is shown. The exemplary distribution cable 30 comprises a plurality of buffer tubes 34 with each buffer tube 34 containing a plurality of optical fibers 42. The distribution cable 30 shown is a loose tube design that facilitates mid-span access in the factory. The distribution cable 30 optionally comprises a single, lengthwise extending central strength member 35 substantially centered within the plurality of buffer tubes 34. Similar to the strength member 40 positioned within the overmolded body 52, the central strength member 35 of the distribution cable 30 is preferably comprised of GRP. However, it will be understood by those skilled in the art that any suitable material may be used. For certain cable types, other components such as water swellable tapes and dielectric strength members may be positioned within the cable sheath 32 in a known manner.

A typical terminated optical fiber 28 is shown being routed from a buffer tube 34 into the tubular body 31. However, the optical fiber 28 may alternatively be routed directly into the tether cable 26 as previously described. As stated above, the terminated optical fibers 28 are smoothly transitioned into the tubular body 31 and spliced to optical fibers of the tether cable 26. The strength member 40 is axially aligned with the distribution cable 30, and in addition with the strength member 35 and the tubular body 31, such that the strength member 40 is operable for creating a preferential bend along an axis that is common to both the distribution cable 30 and the tubular body 31. As shown, the axis is further common to the strength member 40 and the strength member 35 concentrically positioned within the distribution cable 30. However, as will be readily understood by those skilled in the art, the axis need not extend through (i.e., bisect) the strength member 40 and the strength member 35 as long as the axis is common to the distribution cable 30 and tubular body 31 so that the terminated optical fibers 28 can be transitioned from the distribution cable 30 into the tubular body 31 along the common axis. As shown in FIG. 1, the strength member 40 is rod shaped and extends lengthwise along the mid-span access location 22. Preferably, the strength member 40 is secured to the tubular body 31 and the distribution cable 30 by the conventional fastener 54, strap or tape. By aligning the strength member 40 with the distribution cable 30, and in particular with the central strength member 35 of the distribution cable 30, the mid-span access location 22 has a preferential bend along a neutral axis indicated by reference numeral 100 in FIGS. 2–10. As used herein, the term "neutral axis" is intended to describe the axis along which the axial stresses of the terminated optical fibers 28 and the remaining optical fibers 42 of the distribution cable 30 is substantially equal to zero, thus reducing any path length differences between the terminated optical fibers 28 and the remaining optical fibers 42. By bending the mid-span access location 22 along the neutral axis 100, the strength members 35, 40 are stressed equally. If a force is applied to the mid-span access location 22, the axial alignment and tensile strength of the strength members 35, 40 minimizes torsion and causes the mid-span access location 22 to bend along the neutral axis 100. Furthermore, the addition of strength member 40 creates a preferential bend in the mid-span access location 22 along the neutral axis 100 such that the magnitude of the axial stresses in the terminated optical fibers 28 routed substantially along the neutral axis 100 is minimized, thereby preventing failure or breakage of optical fibers 28. Finally, the use of the strength member 40 preserves the integrity of the overmolded body 52 by creating a preferential bend along an axis that reduces the amount of stress in the thinnest or weakest areas of the overmolding material in the mid-span access location 22.

Figure 3:
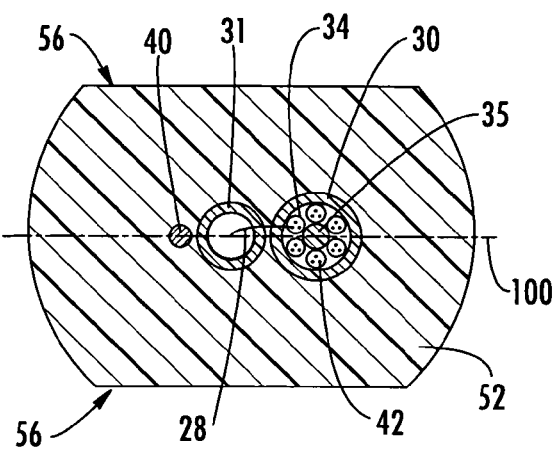
FIG. 3 is a cross-sectional view of another exemplary embodiment of a mid-span access location including a strength member positioned within an overmolded body having a geometric configuration formed by D-cuts.

Referring now to FIG. 3, a cross-sectional view of another exemplary embodiment of a mid-span access location 22 is shown. As in the previous embodiment, the mid-span access location 22 comprises an additional strength member 40. The flexibility of the mid-span access location 22 depends primarily on the overmolding material chosen and the geometrical configuration of the overmolded body 52. As shown, the geometrical configuration of the overmolded body 52 is formed by making D-cuts, indicated by reference numeral 56 in FIG. 3, or by overmolding the body 52 within a tool having the desired cross-sectional shape. By the inclusion of the strength member 40 and the geometrical configuration of the overmolded body 52, the mid-span access location 22 has a preferential bend along the neutral axis 100. In an alternative embodiment, the additional strength member 40 may be removed and the geometrical configuration of the overmolded body 52 will still provide a preferential bend along the neutral axis 100, although to a lesser extent.

Figure 4:
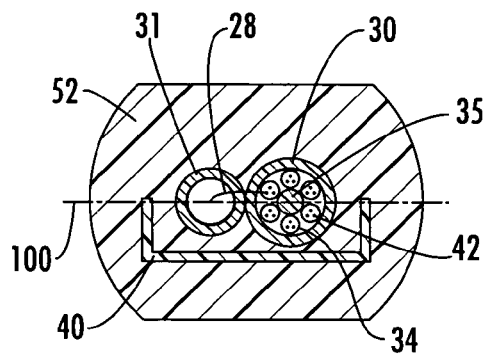
FIG. 4 is a cross-sectional view of another exemplary embodiment of a mid-span access location including a generally U-shaped strength member positioned within an overmolded body having a geometric configuration formed by D-cuts.
Figure 5:
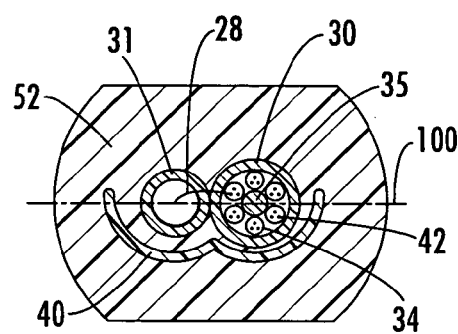
FIG. 5 is a cross-sectional view of another exemplary embodiment of a mid-span access location including a generally W-shaped strength member positioned within an overmolded body having a geometric configuration formed by D-cuts.
Figure 6:
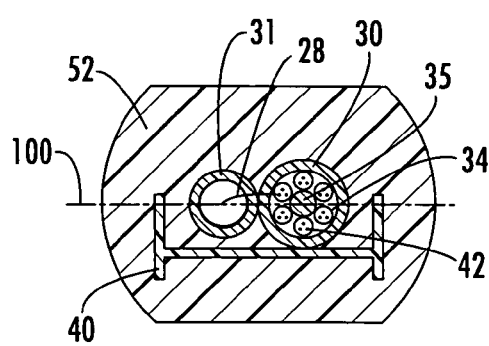
FIG. 6 is a cross-sectional view of another exemplary embodiment of a mid-span access location including a generally I-shaped strength member positioned within an overmolded body having a geometric configuration formed by D-cuts.

Referring now to FIGS. 4–6, cross-sectional views of other exemplary embodiments of mid-span access locations 22 including strength members 40 having various structures are shown. In each embodiment, the distribution cable 30 includes an optional lengthwise extending central strength member 35 substantially concentric with the plurality of buffer tubes 34 and the cable sheath 32. In the examples shown in FIGS. 4–6, a typical optical fiber 28 of a buffer tube 34 is terminated from the distribution cable 30 and smoothly transitioned into the tubular, body 31. Positioned partially around the tubular body 31 and the distribution cable 30 within the overmolded body 52 is a strength member structure 40 having a shape operable for providing the mid-span access location 22 with a preferential bend so that any path length differences between the optical fibers 28 routed substantially along the neutral axis 100 and the optical fibers 42 remaining within the helically wound buffer tubes 34 of the distribution cable 30 are reduced, thereby preventing breakage of the terminated optical fibers 28. Referring specifically to FIG. 4, the strength member structure 40 is generally U-shaped in cross section and extends lengthwise along the mid-span access location 22. The strength member structure 40 is positioned within the overmolded body 52 adjacent the tubular body 31 and the distribution cable 30 such that a preferential bend is created along an axis common to both the distribution cable 30 and the tubular body 31. Referring specifically to FIG. 5, a generally W-shaped strength member structure 40 is shown positioned within the overmolded body 52 adjacent the tubular body 31 and the distribution cable 30 to create a preferential bend along the common axis. Referring specifically to FIG. 6, a generally I-shaped strength member structure 40 is shown positioned within the overmolded body 52 adjacent the tubular body 31 and distribution cable 30 to create a preferential bend along the common axis. Each of these additional strength member structures 40, and optionally in conjunction with the overmolded body 52 formed by D-cuts, provides for preferential bending of the mid-span access location 22 along the neutral axis 100.

Figure 7:
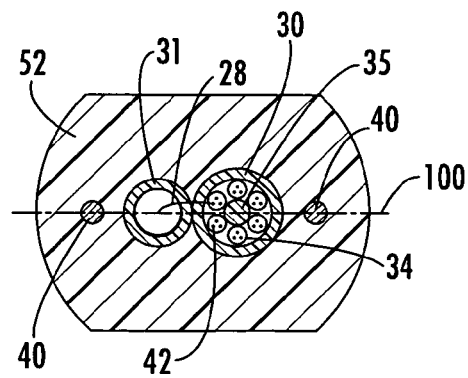
FIG. 7 is a cross-sectional view of another exemplary embodiment of a mid-span access location including a pair of strength members positioned within an overmolded body having a geometric configuration formed by D-cuts.

Referring now to FIG. 7, a cross-sectional view of another exemplary embodiment of a mid-span access location 22 is shown. In this embodiment, a pair of additional strength members 40 is positioned within the overmolded body 52 prior to overmolding the mid-span access location 22. The strength members 40 are positioned within the overmolding tool using fasteners or tape. The resulting mid-span access location 22 comprises a total of three strength members, including the distribution cable 30 strength member 35, and an overmolded body 52 having a geometric configuration with the aforementioned "D-cut" shape. The additional strength members 40, along with the geometric configuration of the overmolded body 52 create a preferential bend along an axis (i.e., neutral axis 100) common to the tubular body 31 and the distribution cable 30 and substantially on which the terminated optical fibers 28 are routed from the distribution cable 30 into the tubular body 31 or tether cable 26.

Figure 8:
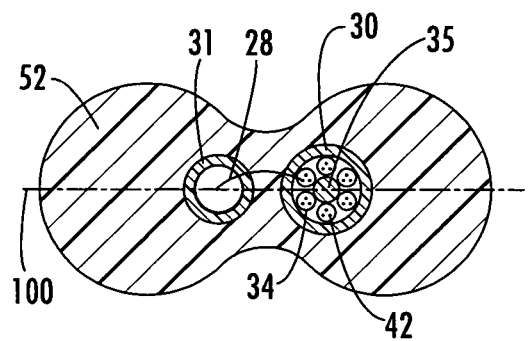
FIG. 8 is a cross-sectional view of another exemplary embodiment of a mid-span access location including an overmolded body having a figure-eight shaped geometric configuration.
Figure 9:
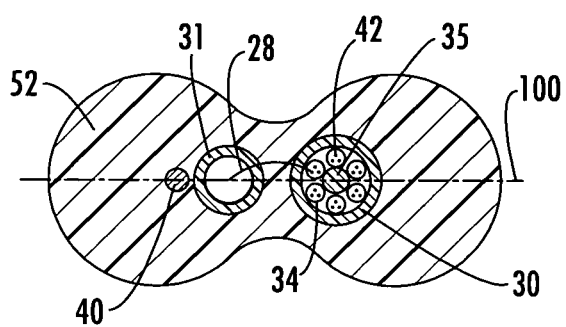
FIG. 9 is a cross-sectional view of another exemplary embodiment of a mid-span access location including a strength member positioned within an overmolded body having a figure-eight shaped geometric configuration.

Referring to FIGS. 8 and 9, cross-sectional views of further exemplary embodiments of a mid-span access location 22 are shown. A typical optical fiber 28 of a buffer tube 34 is shown that is terminated and smoothly transitioned into the tubular body 31 and spliced to an optical fiber 24 of the tether cable 26. The molding tool (not shown) defines a figure-eight shape such that the overmolded body 52 is formed having a geometric configuration with a figure-eight profile. The geometric configuration of the overmolded body 52 reduces the amount of material along the top and bottom of the mid-span access location 22, thereby further promoting bending along the neutral axis 100. In FIG. 8, the use of the geometric configuration with the figure-eight profile alleviates the need for an additional strength member 40, while still providing a low-profile distribution cable assembly 20 that can be routed through conduits or deployed over aerial lashing equipment without creating path length differences between the optical fibers terminated from the distribution cable 30 and the optical fibers 42 remaining within the buffer tubes 34 of the distribution cable 30. Referring to FIG. 9, a strength member 40 may optionally be positioned within the overmolded body 52 as previously described to further promote bending along the neutral axis 100.

Figure 10:
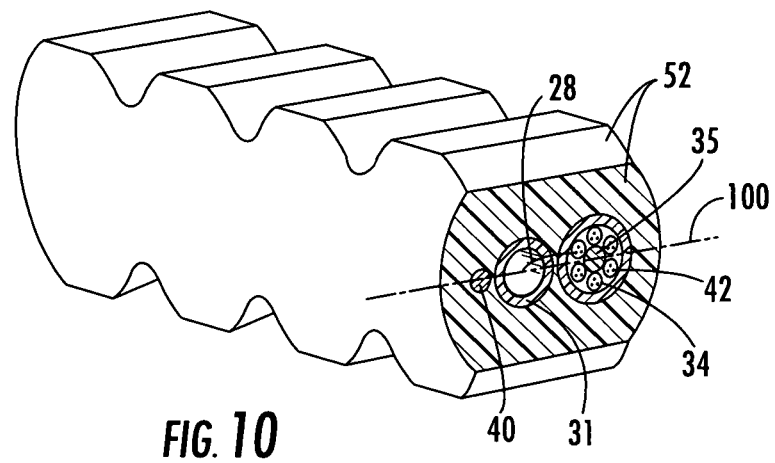
FIG. 10 is a perspective and cross-sectional view of another exemplary embodiment of a mid-span access location including a strength member positioned within an overmolded body having an accordion shaped geometric configuration.

Referring now to FIG. 10, a perspective cross-sectional view of another exemplary embodiment of a mid-span access location 22 is shown. The molding tool (not shown) for forming the overmolded body 52 defines a ribbed or accordion shape that extends lengthwise along the mid-span access location 22 such that the mid-span access location 22 maintains a preferential bend along the neutral axis 100. By removing material away from the neutral axis 100 along the length of the mid-span access location 22, bending will naturally occur in the direction of less material, and therefore less resistance. Furthermore, by varying the depth of the material removed from the overmolded body 52, the radius of curvature of the mid-span access location 22 can be modified and controlled. An additional strength member 40 may optionally be positioned with in the overmolded body 52 as previously described to further prevent the mid-span access location 22 from bending along an axis other than the neutral axis 100.

Various exemplary embodiments have been disclosed for providing a mid-span access location with preferential bending along an axis on which optical fibers terminated from a distribution cable may be routed to thereby reduce any path length differences between the terminated optical fibers and optical fibers remaining within the buffer tubes of the distribution cable. The foregoing is a description of various embodiments of the invention that are provided here by way of example only. However, other embodiments and examples may perform similar functions and/or achieve similar results. Therefore, all such equivalent embodiments and examples within the spirit and scope of the present invention are intended to be covered by the appended claims.

That which is claimed is:

1. A fiber optic distribution cable assembly, comprising:
a distribution cable comprising a plurality of optical fibers and having at least one predetermined mid-span access location positioned along the length of the distribution cable, at least one of the plurality of optical fibers accessed and terminated from the distribution cable at the mid-span access location;
a tether comprising a first end attached to the distribution cable at the mid-span access location and at least one optical fiber optically connected to the at least one optical fiber terminated from the distribution cable; and
an overmolded body comprising a flexible material encapsulating the distribution cable and a portion of the tether to form the mid-span access location;
wherein the overmolded mid-span access location is provided with a preferential bend.

2. The fiber optic distribution cable assembly of claim 1, wherein the preferential bend of the mid-span access location is along an axis that is common to the distribution cable and the tether and wherein the at least one optical fiber terminated from the distribution axis is routed into the tether substantially on the common axis.

3. The fiber optic distribution cable assembly of claim 1, wherein the preferential bend is provided by at least one strength member axially aligned with the distribution cable.

4. The fiber optic distribution cable assembly of claim 3, wherein the at least one strength member is positioned within the overmolded body.

5. The fiber optic distribution cable assembly of claim 3, wherein the at least one strength member causes the mid-span access location to bend along an axis that is common to the distribution cable and the tether and wherein the at least one optical fiber terminated from the distribution axis is routed into the tether substantially on the common axis.

6. The fiber optic distribution cable assembly of claim 3, wherein the at least one strength member is generally rod shaped and extends lengthwise along the mid-span access location.

7. The fiber optic distribution cable assembly of claim 3, wherein the at least one strength member is generally U-shaped and extends lengthwise along the mid-span access location.

8. The fiber optic distribution cable assembly of claim 3, wherein the strength member is generally I-shaped and extends lengthwise along the mid-span access location.

9. The fiber optic distribution cable assembly of claim 3, wherein the strength member is generally W-shaped and extends lengthwise along the mid-span access location.

10. The fiber optic distribution cable assembly of claim 1, wherein the overmolded body has a predetermined geometrical configuration for providing the preferential bend of the mid-span access location.

11. The fiber optic distribution cable assembly of claim 10, wherein the geometrical configuration of the overmolded body is generally cylindrical with D-cuts formed on opposing lateral sides of the overmolded body.

12. The fiber optic distribution cable assembly of claim 10, wherein the geometrical configuration of the overmolded body comprises a figure-eight shape.

13. The fiber optic distribution cable assembly of claim 10, wherein the geometrical configuration of the overmolded body comprises an accordion shape.

14. A fiber optic distribution cable assembly, comprising:
a distribution cable comprising a plurality of optical fibers and having at least one predetermined mid-span access location positioned along the length of the distribution cable, at least one of the plurality of optical fibers accessed and terminated from the distribution cable at the mid-span access location;
a tether comprising a first end attached to the distribution cable at the mid-span access location and at least one optical fiber optically connected to the at least one optical fiber terminated from the distribution cable; and
an overmolded body comprising a flexible material encapsulating the distribution cable and a portion of the tether to form the mid-span access location;
wherein the overmolded body has a predetermined geometrical configuration that provides the mid-span access location with a preferential bend along an axis that is common to the distribution cable and the tether.

15. The fiber optic distribution cable assembly of claim 14 wherein the at least one optical fiber terminated from the distribution cable is routed into the tether substantially on the common axis.

16. The fiber optic distribution cable assembly of claim 14, further comprising at least one strength member axially aligned with the distribution cable.

17. The fiber optic distribution cable assembly of claim 16, wherein the at least one strength member is positioned within the overmolded body.

18. A fiber optic distribution cable assembly, comprising:
a distribution cable comprising a plurality of optical fibers and at least one factory-prepared mid-span access location positioned along the length of the distribution cable, at least one of the plurality of optical fibers accessed and terminated from the distribution cable at the mid-span access location;
a tether comprising a first end attached to the distribution cable at the mid-span access location and at least one optical fiber optically connected to the optical fiber terminated from the distribution cable;
an overmolded body formed from a flexible material encapsulating the distribution cable and a portion of the tether to form the mid-span access location; and
means for providing the mid-span access location with a preferential bend along an axis that is common to the distribution cable and the tether.

19. A fiber optic distribution cable assembly according to claim 18, wherein the preferential bend reduces any path length difference between the optical fiber terminated from the distribution cable and an optical fiber remaining within the distribution cable induced by bending to thereby prevent breakage of the optical fiber terminated from the distribution cable.

20. A fiber optic distribution cable assembly according to claim 18, wherein the means for providing a preferential bend is selected from the group consisting of a strength member axially aligned with the distribution cable and a predetermined geometrical configuration of the overmolded body.

* * * * *